June 4, 1946.　　　A. V. WALKER　　　2,401,532
HAND AND POWER STEERING MECHANISM
Filed May 24, 1944　　　3 Sheets-Sheet 1

INVENTOR.
Arnold V. Walker.
BY Wilfred E. Lawson
ATTORNEY.

June 4, 1946.   A. V. WALKER   2,401,532
HAND AND POWER STEERING MECHANISM
Filed May 24, 1944   3 Sheets-Sheet 2

INVENTOR.
Arnold V. Walker
BY Wilfred E. Lawson
ATTORNEY.

June 4, 1946.    A. V. WALKER    2,401,532
HAND AND POWER STEERING MECHANISM
Filed May 24, 1944    3 Sheets-Sheet 3
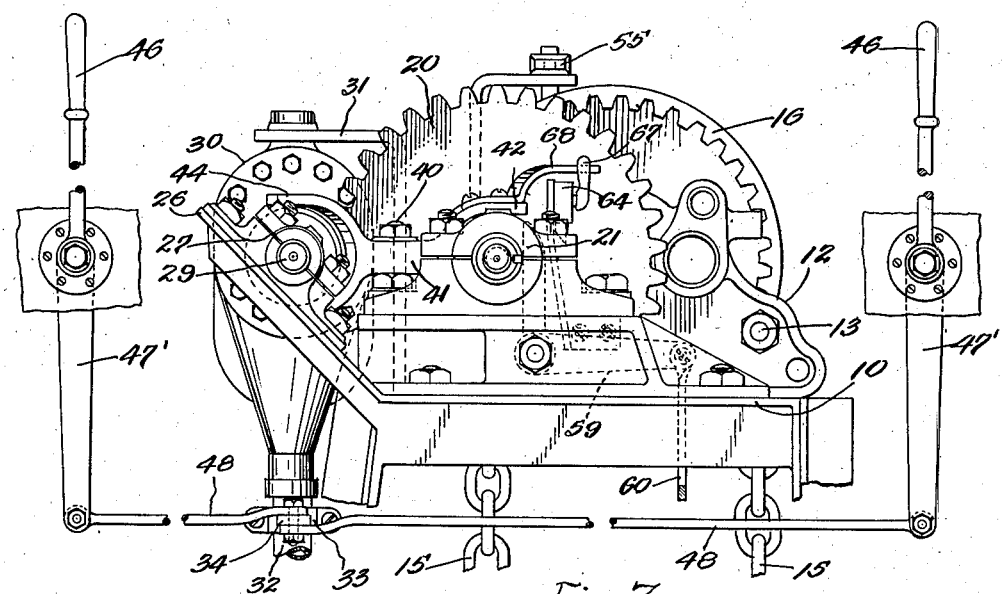
Fig. 3.
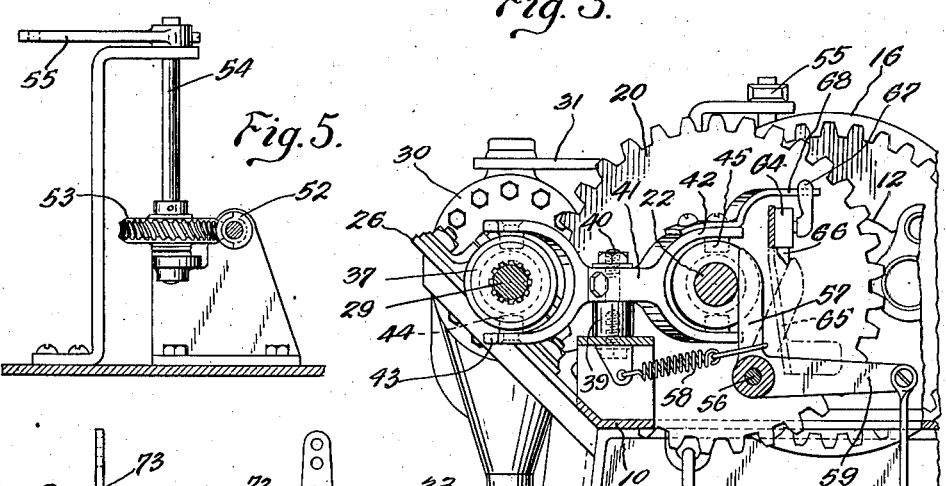
Fig. 5.
Fig. 4.
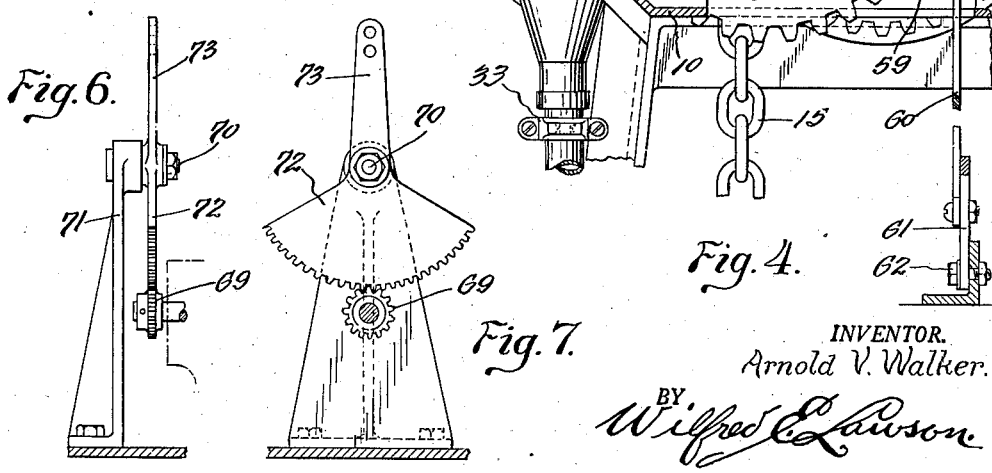
Fig. 6.
Fig. 7.
INVENTOR.
Arnold V. Walker.
BY Wilfred E. Lawson
ATTORNEY.

Patented June 4, 1946

2,401,532

UNITED STATES PATENT OFFICE 2,401,532

HAND AND POWER STEERING MECHANISM

Arnold V. Walker, Pascagoula, Miss.

Application May 24, 1944, Serial No. 537,174

10 Claims. (Cl. 114—146)

This invention relates generally to ships or other craft requiring a steering control means and pertains particularly to improvements in steering mechanism therefor.

A principal object of the present invention is to provide a steering mechanism designed to be controlled either by power means or by the well known hand operated steering wheel, the mechanism being so constructed that the hand and power operating units may be selectively employed, with one unit completely operatively disconnected from the other unit while in use.

The mechanism of the present application is generally based upon that shown in my Patent No. 2,362,178, of November 7, 1944, and constitutes an improvement thereof in several respects, one improvement residing in the specific manner of effecting the change-over from the power drive to the hand drive and vice versa.

Another object of the invention, in addition to providing an improved change-over means between the power drive and the hand drive, is to provide an improved automatic latching or securing means for the reciprocable steering wheel shaft whereby after the shift has been completed, the shaft will be automatically secured or locked against accidental longitudinal movement.

Other objects and advantages of the present invention will become apparent as the description of the same proceeds and the invention will be best understood from a consideration of the following detailed description taken in association with the accompanying drawings forming a part of this specification, with the understanding, however, that minor changes and modifications may be made in the mechanism so long as such changes or modifications do not depart materially from the salient features of the invention as expressed in the appended claims.

In the drawings:

Figure 3 is a view in front elevation of the mechanism with the steering wheel removed from its supporting shaft.

Figure 4 is a sectional view taken substantially upon the line 4—4 of Figure 2.

Figure 5 is a sectional view upon the line 5—5 of Figure 1.

Figure 6 is a view illustrating a modified connection between the chain sheave and the rudder position indicators.

Figure 7 is a front view of the structure shown in Figure 6.

Figure 1:
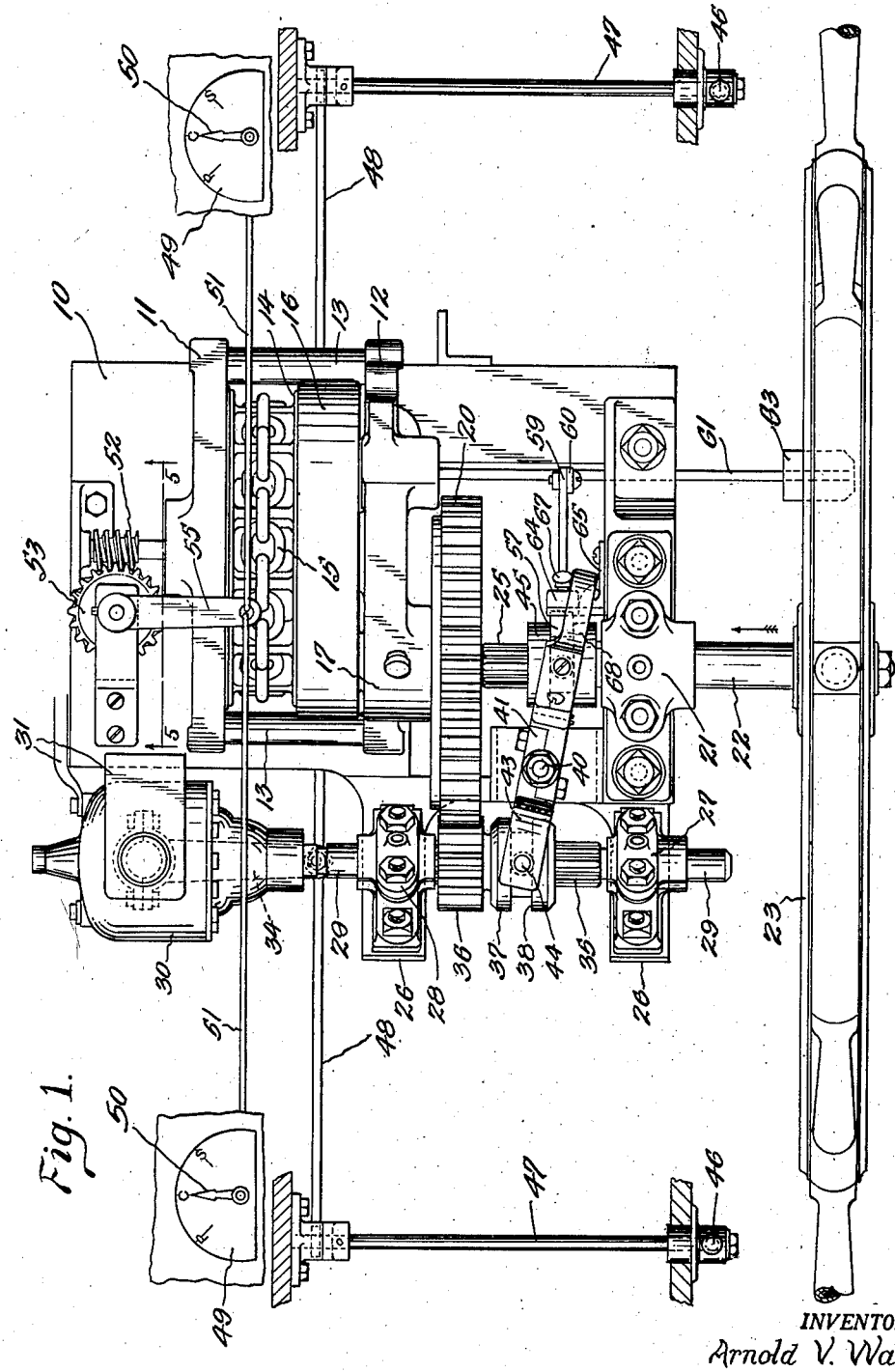
Figure 1 is a view in top plan of the steering mechanism set for power steering.

Referring now more particularly to the drawings, the numeral 10 designates any suitable bed or support for the steering mechanism.

Mounted upon the bed 10 are the two spaced, vertical bearing plates 11 and 12. Between the bearing plates 11 and 12 the bed 10 has a suitable opening, not shown, for the extension downwardly therethrough of the hereinafter described rudder chain.

The bearing plates 11 and 12 are coupled together by the pins 13 and rotatably supported between and by these plates is the rotary unit comprising the rudder chain sheave 14 which is formed for locking connection with the links of a rudder chain 15 which passes around the sheave, and the internal gear 16 which may be cast as an integral part or unit with the chain sheave.

The open side of the internal gear 16 is directed toward the front or forward side of the steering mechanism and there is supported in the bearing portion 17 of the forward bearing plate 12, the stub shaft 18, upon the rear end of which is fastened the gear pinion 19, which is positioned within and has toothed connection with the internal gear 16.

Upon the opposite side of the forward bearing plate 12, the shaft 18 has fastened thereto the large power gear 20.

At the front of the mechanism bed there is secured the bearing 21. Through this bearing extends the steering wheel shaft 22, upon the forward end of which is removably mounted the hand steering wheel 23.

The bearing 21 is aligned with the bearing 17 and consequently the shaft 22 is coaxial with the stub shaft 18.

The forward end of the stub shaft 18 is formed with a splined socket 24 while the inner end of the steering wheel shaft 22 is exteriorly splined as indicated at 25 and is designed to be received in the splined socket 24 when the shaft 22 is shifted rearwardly, so as to establish a driving connection between the shaft 22 and the stub shaft 18 whereby rotary motion may be given to the internal gear and the chain sheave by means of the steering wheel 23. When the steering wheel shaft 22 is shifted forwardly to the limit of its movement where it is shown in Figure 1, it will be seen that the splined inner end 25 is removed from the splined socket 24 and therefore the shaft 22 is entirely disconnected from the power transmitting stub shaft 18.

At one side of the bed 10 there are fixed the laterally upwardly extending bearing supporting arms 26 which are spaced apart lengthwise of the apparatus and carry the forward and rear bearings 27 and 28 respectively.

Extending through and supported by the bearings 27 and 28 is the motor drive shaft 29, the rear end of which is operatively coupled with the shaft, not shown, of an air motor 30. This air motor is supported in a suitable manner from the bed 10 as, for example, by the brackets 31.

Figure 2:
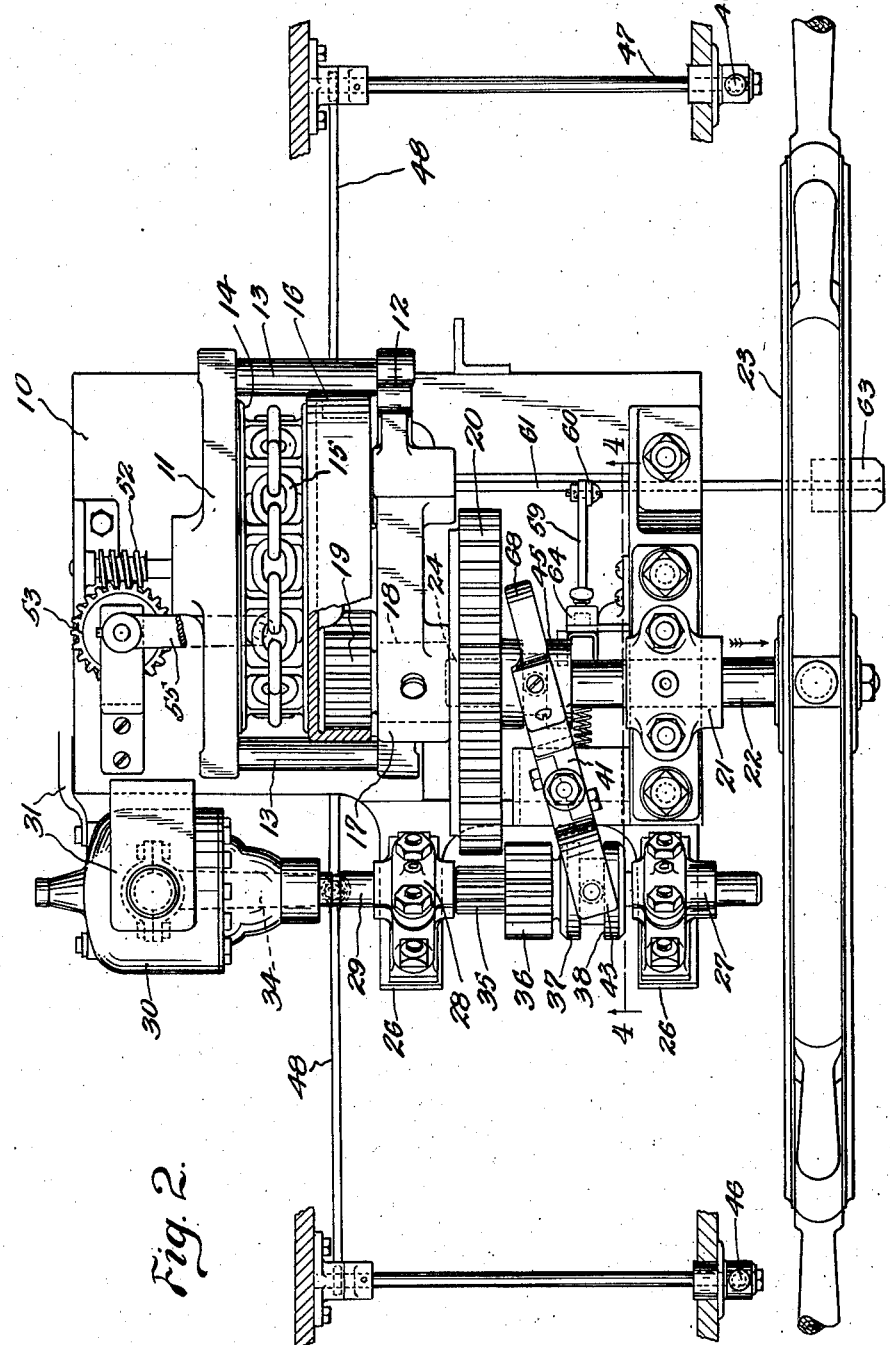
Figure 2 is a view corresponding to Figure 1, parts being in section, and showing the hand wheel and shaft therefor shifted to hand steering position.

The air motor is supplied from a suitable source, with air under pressure through the pipe 32 and the flow of air is controlled by a suitable valve unit 33 having the control lever or arm 34 by means of which the direction of flow of the air into and through the motor may be controlled, dependent upon the direction in which the lever is pulled from the central or neutral position in which it is shown in Figures 2 and 3. No detailed illustration or description of this motor is given or believed necessary since the motor forms no part in itself of the present invention.

Between the bearings 27 and 28 the motor shaft or power shaft 29 is splined as indicated at 35 and slidably mounted upon this splined portion of the shaft is the gear pinion 36 and the circumferentially channelled shift collar 37, the circumferential channel of which is designated 38.

The pinion 36 has an operative and inoperative position, the operative position being adjacent the rear bearing 28 where the pinion is in toothed engagement with the power gear 20 and the inoperative position being forwardly and out of engagement with the power gear as shown in Figure 2. Figure 1 illustrates the power position for the pinion where the driving connection is established between the motor and the chain sheave for the mechanical or motor actuation of the rudder chain and rudders. In this figure the hand wheel control for the rudders is out of operation while in Figure 2 it is shown in operation with the power drive means out of operation.

The shifting of the connections between the power gear and the power pinion 36 and between the stub shaft 18 and the hand wheel shaft 22 or, what might be termed the "change-over," is effected automatically by the manual back and forth movement of the hand wheel shaft 22, in the following manner.

Upon a suitable support located between the shafts 22 and 29, as indicated at 39 there is mounted for oscillation about the pivot pin 40, the shift lever or arm which is generally designated 41. This arm terminates at its two ends in the shift forks 42 and 43, the fork 42 straddling the hand wheel shaft 22 while the fork 43 straddles the collar 37, as shown in Figure 4.

Each of the forks carries upon the inner sides of the two parts thereof, the pins 44, the pins of the fork 43 being loosely engaged in the circumferential channel of the shift collar 37.

Secured to the steering wheel shaft 22 is a shift collar 45 which, like the collar 37, has a circumferential channel in which the pins of the forks 42 loosely engage.

It will thus be seen that there is an operative coupling between the shaft 22 and the shiftable collar 37 with which the power pinion 36 is joined, whereby upon longitudinal shifting of the steering wheel shaft 22 shifting movement will be imparted in the opposite direction to the power pinion 36 and in this manner the desired changeover from hand control to power control or vice versa is readily accomplished.

When the mechanism has been set to be power operated, as it is shown in Figure 1, the control of the flow of fluid to the air motor 30 or the driving of the rudder chain in the direction desired, is by means of the two pivoted hand levers 46. These levers 46 are connected with the air control valve 33 for the air motor in a suitable manner, for example, by means of the shafts 47, crank arms 47' and rods 48. The connections between the rods 48 and the crank arms 47' may be of any suitable character such as ball and socket connections or simple pivot pin couplings. The other ends of the rods 48 are pivotally connected as shown particularly in Figure 3, with the motor valve control lever 34. These hand levers 46 are located at convenient positions upon opposite sides of the steering wheel so that the pilot or operator of the mechanism may grasp each lever with one hand and oscillate the valve for the air motor to the right or to the left as desired depending upon which way it is desired that the motor rotate.

In order that the operator of the steering control mechanism may know at all times the position in which the steering rudder is set, there is provided an indicating means employing two dials 49, a pointer or stylus 50 and shift cords or cables 51, in association with a control unit, which is operated synchronously with the chain sheave, to move the pointers 50 upon turning of the sheave. While two indicator dials 49 are shown it will be readily apparent that one only need be employed if desired although by employing two indicators placed one at each side of the mechanism, the operator of the mechanism can see the rudder position without having to turn his head from one side to the other.

For the actuation of the indicator pointers there is provided in the structure shown in Figures 1, 2 and 5, a worm 52 which is coaxially coupled with the chain sheave to be rotated therewith. Adjacent to and in operative connection with the worm 52 is the worm gear 53, to the shaft 54 of which is secured the arm 55. The cables 51 leading to the indicator pointers 50 are attached to the end of the arm 55 so that any movement imparted to the chain sheave will immediately be transmitted to the indicator pointers 50.

For the purpose of securing the mechanism in each of its two operating positions, the following locking mechanism is provided.

Pivotally mounted in a suitable manner as indicated at 56, in Figure 4, is a locking dog 57 with which is connected a suitable control spring 58 to constantly urge oscillation of the dog toward the steering wheel shaft 22. This dog is so located that it will engage in front of the shift collar 45 to hold the shaft 22 against forward or outward movement, when the splined inner end of the shaft 22 is operatively coupled with the stub shaft 18. When the mechanism is set for power control where the steering wheel shaft 22 will be drawn forwardly as shown in Figure 1, the upper end of the dog 57 will then engage in the circumferential groove of the collar 45 as shown in Figure 1.

Connected with the dog 57 is a lever arm 59 and this has connected with its outer end a pull link 60 which, at its lower end, is pivotally attached to a treadle bar 61 which is pivoted upon the floor as at 62 and which carries the treadle 63 upon its forward end in a position convenient to the operator of the mechanism so that by the use of his foot he may depress the lever 61 and cause the dog 57 to oscillate away from the shaft 22 or from the collar 45, against the tension of the spring 58.

In order to hold the dog in the prepared position stated or, in position away from the shaft 22 or from the collar 45, preparatory to shifting the shaft and collar, there is provided a holding latch 64 which is supported upon a suitable bracket 65 above the dog 57 in the plane of oscillation thereof. This latch has the downwardly directed vertically movable bolt 66 which is engaged and forced upwardly by the top end or tip of the dog 57 in the outward swinging thereof so that the bolt will hold the dog in the outswung position as shown in Figure 4.

Retraction of the latch bolt 66 is effected by the oscillatable handle 67 which stands upright as shown. Such oscillation may be accomplished by hand if desired but means is provided whereby it will be oscillated automatically upon the shifting of the part. Such means comprises a trip arm 68 which is secured to and extends laterally from the top of the fork 42 in such position that each time this fork swings forwardly or backwardly the arm will sweep across the latch handle 67 and oscillate it to effect the retraction of the bolt 66.

In Figures 6 and 7 there is shown another arrangement for transmitting motion from the chain sheave to the indicator cords or cables 51. In this arrangement a spur gear 69 is operatively coupled with the chain sheave and there is mounted upon a pivot pin 70, supported above the pinion 69 by a suitable bracket 71, a gear quadrant 72. Integral with the gear quadrant 72 is the upstanding arm 73 with which the indicator cords or cables 51 are connected. It is believed that the operation of this construction will be readily apparent.

In the operation of the steering mechanism the parts are in the positions shows in Figure 1 when the mechanism is to be power operated. At such time turning movement is imparted to the chain sheave 14 to turn the rudder, by the air motor 30. The direction of rotation of the motor and consequently the direction of turning of the rudder, is accomplished by oscillating the hand levers 46 to the right or to the left so as to swing the valve control lever 34 for the motor in the desired direction from the neutral position. In the neutral position of the valve lever 34, the motor will be stationary and the rudder will be at the center position as shown by the indicators 49. It is not necessary that the valve lever 32 be in the neutral position when the shift from power steering to hand steering is made. This change may be accomplished at any time regardless of the position of the valve lever and the hand levers 46.

When it is desired to shift over to hand steering, the operator first depresses the pedal lever 61 to unlock the collar 45. This swings the collar locking dog 57 outwardly until it is engaged behind the bolt of the latch 64 as illustrated in broken lines in Figure 4. The steering wheel shaft is then shoved in, in the direction indicated by the arrow in Figure 1. This causes the oscillation of the shift fork lever 41 simultaneously with the stub shaft 18. At the same time the fork 43 will pull the power pinion 36 forwardly disengaging it from the power gear 20.

Also, simultaneously with the axial shifting of the shaft 22, the trip lever 68 will swing across the latch handle 67 causing the retraction of the bolt 66 and releasing the dog 57, allowing the latter to swing inwardly under the action of the spring 58, to engage the front side of the collar 45 and thus hold the steering wheel shaft 22 against the reverse movement outwardly or forwardly. Thus the shift over is accomplished from power steering to hand steering and it will be readily apparent that the reverse operation is carried out when it is desired to shift back from hand steering to power steering.

I claim:

1. A ship steering mechanism, comprising a rotatable rudder actuating element, a rotatable hand steering wheel, a stationary power motor including a shaft, a rotary member having driving connection with said element, means supporting the steering wheel facilitating shifting said wheel axially, and means actuated by the axial shifting of the wheel for selectively operatively coupling the motor shaft and the wheel with the rotary member.

2. A ship steering mechanism, comprising a rotatable rudder actuating element, a rotary shaft supported for axial movement, means for establishing a driving connection between the shaft and element upon axial movement of the shaft in one direction, a hand wheel carried by the shaft, a fixed motor having a drive shaft, shiftable means for establishing a driving connection between said motor shaft and actuating element, and means connecting the first shaft and the shiftable means together by which upon axial movement of the first shaft in a direction to establish driving connection between the same and said element, the shiftable means will be moved out of driving connection with said element and vice versa.

3. A steering mechanism as set forth in claim 2, in which the means connecting the first shaft and the shiftable means comprises a pivotally supported lever disposed between the rotary shaft and the motor shaft, and a pivotal connection between the first shaft and the adjacent end of the lever and between the shiftable means and the adjacent end of the lever.

4. A steering mechanism as set forth in claim 2, with a lever pivotally supported between the shafts, a fork upon each end of the lever having straddling relation with the adjacent shaft, and a member carried by and rotatable with each of said shafts and disposed within the adjacent fork, each fork having loose connection with the member therein whereby such member may turn with the shaft, the one of said members carried by the motor shaft being connected with said shiftable means.

5. A steering mechanism as set forth in claim 2, with means for locking the said rotary shaft against axial movement when both in and out of driving connection with the rudder actuating element.

6. A ship steering mechanism, comprising a rotatable rudder actuating element, a rotary gear having driving connection with said element, a fixed motor having a shaft, a gear pinion splined to the shaft and movable thereon into and out of engagement with the gear, an axially movable rotatably supported shaft, a hand wheel carried by the last mentioned shaft, means for establishing a driving coupling between the last mentioned shaft and said gear upon movement of the shaft axially in one direction, and a shift coupling between the last mentioned shaft and the gear pinion whereby upon movement of the last mentioned shaft axially in one direction the gear pinion will be shifted in the opposite direction, the gear pinion being out of connection with said gear when the axially movable shaft is operatively coupled with the gear.

7. A steering mechanism as set forth in claim 6, with means for locking said axially movable shaft against movement when it is in full driving connection with the rudder actuating element and when it is fully out of driving connection with such element.

8. A steering mechanism as set forth in claim 6, with a means for locking the axially shiftable shaft in either of its two extreme positions of movement, comprising an oscillatable rock bar, means constantly urging the bar towards engagement with the shaft, means for establishing a coupling between the rock bar and the shaft when the shaft is in either of its two extreme positions of movement to hold the shaft against reverse movement, means for effecting the oscillation of the rock bar away from the last mentioned shaft, means for latching the rock bar in position away from the last mentioned shaft, and means for automatically releasing the rock bar for reengagement with the last mentioned shaft at the completion of movement of the last mentioned shaft axially in one direction.

9. The combination with a ship steering mechanism including a rotatable rudder actuating element, of a rudder position indicator including a movable pointer, a pivoted oscillatable member operatively coupled with the rudder actuating element to be oscillated with and by the rotatable rudder actuating element upon turning of the latter in either clockwise or counter-clockwise direction, and a coupling between the oscillatable element and the pointer for actuating the pointer synchronously with the turning of the actuating element.

10. The combination with a ship steering mechanism including a rotatable rudder actuating element, of a worm connected with said element to be turned thereby, a worm wheel operatively coupled with the worm, an arm connected with the worm wheel to be swung by the worm wheel, a pivoted pointer, and an operative connection between the arm and said pointer for effecting the movement of the pointer synchronously with the turning of the rotatable rudder actuating element.

ARNOLD V. WALKER.